United States Patent [19]

Brücker

[11] Patent Number: 4,781,155

[45] Date of Patent: Nov. 1, 1988

[54] REGENERATIVELY ACTING TWO-STROKE INTERNAL COMBUSTION ENGINE

[76] Inventor: Helmut G. Brücker, Teistlergutstrasse 9/1/6, A-4040 Linz (Oberosterreich), Austria

[21] Appl. No.: 26,439

[22] Filed: Mar. 16, 1987

[30] Foreign Application Priority Data

Mar. 17, 1986 [AT] Austria .................................. 707/86

[51] Int. Cl.⁴ ............................................. F02B 33/22
[52] U.S. Cl. .................................. 123/70 V; 123/53 B
[58] Field of Search ............... 123/53 B, 52 B, 70 R, 123/70 V, 3, 312, 53 R, 58 R, 65 R, 65 B

[56] References Cited

U.S. PATENT DOCUMENTS

| | | | |
|---|---|---|---|
| 1,111,841 | 9/1914 | Koenig . | |
| 1,523,341 | 1/1925 | Della-Ferrera | 123/53 B |
| 1,579,332 | 4/1926 | Metten | 123/53 B |
| 1,682,111 | 8/1928 | Bronander | 123/53 B |
| 1,751,385 | 3/1930 | Beaudry | 123/70 V |
| 1,773,995 | 8/1930 | Goldsborough | 123/53 B |
| 1,904,816 | 4/1933 | Beaudry | 123/70 V |
| 2,048,051 | 7/1936 | Barkeij | 123/70 R |
| 2,516,708 | 7/1950 | Lugt | 123/70 R |

FOREIGN PATENT DOCUMENTS

| | | |
|---|---|---|
| 275948 | 6/1914 | Fed. Rep. of Germany . |
| 377061 | 6/1923 | Fed. Rep. of Germany . |
| 389196 | 1/1924 | Fed. Rep. of Germany . |
| 614347 | 6/1935 | Fed. Rep. of Germany . |
| 1037757 | 2/1959 | Fed. Rep. of Germany . |
| 307098 | 7/1955 | Switzerland . |

Primary Examiner—Charles J. Myhre
Assistant Examiner—David A. Okonsky
Attorney, Agent, or Firm—Young & Thompson

[57] ABSTRACT

In a regeneratively operating two-stroke reciprocating internal combustion engine with at least one working cylinder, a supercharger cylinder (2) is associated with the combustion cylinder (3), the supercharger cylinder being connected to the combustion cylinder (3) by way of a connecting line (4) wherein a regenerator (1) is provided. The pistons (6, 7) of the combustion cylinder (3) and of the supercharger cylinder (2) and, respectively, their crankshafts (14, 23, 24) operate in a phase shift with respect to each other by an angle of between 30° and 90°, the piston (7) of the combustion cylinder (3) being the leading entity.

12 Claims, 2 Drawing Sheets

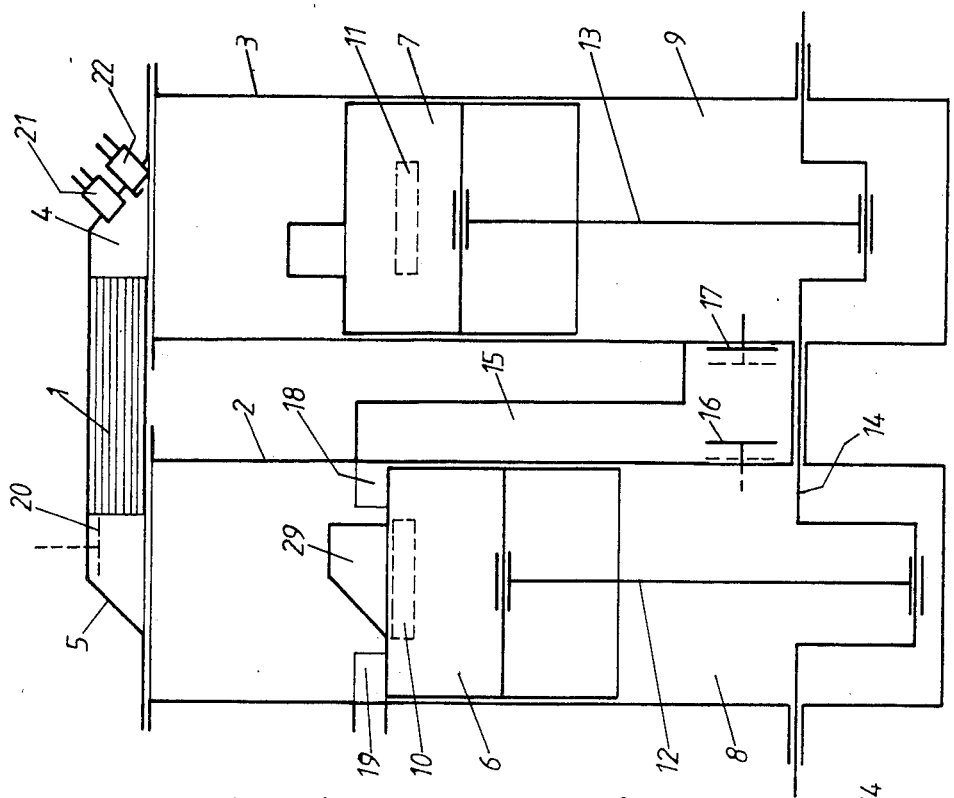
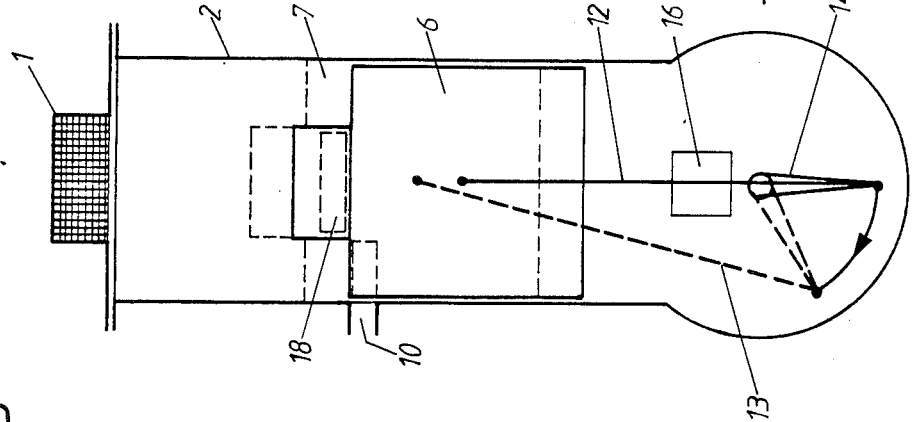

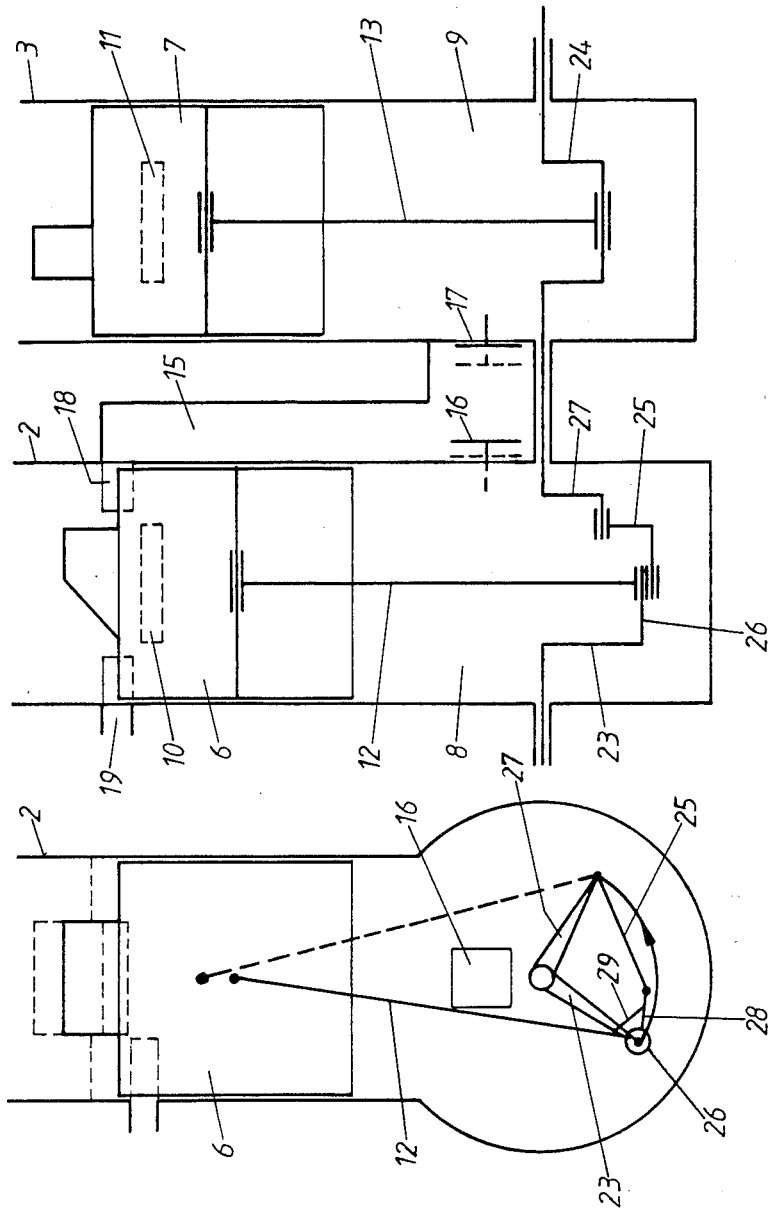

REGENERATIVELY ACTING TWO-STROKE INTERNAL COMBUSTION ENGINE

BACKGROUND OF THE INVENTION

The invention relates to a regeneratively operating two-stroke reciprocating internal combustion engine with at least one combustion cylinder (working cylinder), associated with an ignition device and an arrangement for fuel injection and connected via a connecting line wherein a regenerator is provided with a supercharger cylinder, wherein the pistons of the combustion cylinder and of the supercharger cylinder operate with a mutual phase shift by an angle of between 30° and 90°, the piston of the combustion cylinder leading the piston of the supercharger cylinder.

In detail, the invention concerns a regeneratively operating reciprocating internal combustion engine with at least two cylinders operatively connected by way of a regenerator, the reciprocating pistons of which move with mutual phase shift, one of the two cylinders, namely the one connected to the cooler end of the regenerator, acting as a charge-changing compression and re-expansion unit whereas the other cylinder, connected to the hot end of the regenerator, serves essentially for fuel preparation and, respectively, operates as a combustion and primary expansion unit.

BRIEF DESCRIPTION OF THE PRIOR ART

In conventional, regeneratively operating internal combustion engines, the regenerator pertaining to the compression volume of a cylinder chamber is fashioned either as a piston attachment (British Pat. No. 640,410) or the regenerator is moved coaxially to the piston with phase shift by way of a separate connecting-rod coupling (British Pat. No. 761,122). In both cases, the regeneratively exploitable exhaust energy is small, on the one hand; on the other hand, these internal combustion engines are restricted to relatively low numbers of revolutions on account of the regenerator masses that must be moved.

Furthermore, regeneratively operating reciprocating internal combustion engines are known wherein the regenerator is rotatably arranged in the zone of the cylinder head and faces selectively the cylinder chamber with its hot side or its cold side (DAS Nos. 23 50 075 and 23 50 076). In this conventional arrangement, although a portion of the heat energy present in the exhaust gas is recovered, there occur pressure losses at the end of the working stroke on the order of magnitude of the usual two-stroke or four-stroke systems. Furthermore, a recuperatively operating reciprocating internal combustion engine is known having at least two cylinders and operating according to a so-called "modified Ericsson cycle" wherein a booster or compression cylinder is connected to a working cylinder via a recuperative heat exchanger and corresponding valves (U.S. Pat. No. 4,133,172). The advantages of this system are attained at the cost of a considerable additional expenditure in structural parts in connection with the heat exchanger unit and, respectively, in valve regulation.

U.S. Pat. No. 1,111,841 discloses an internal combustion engine in accordance with the preamble of claim 1. The conventional internal combustion engine comprises a working cylinder, an ignition device, and an arrangement for fuel injection through which is injected alternatively fresh air conveyed from the compressor (supercharger cylinder) to the combustion cylinder, gas, or oil, or through which a gas-air mixture can be introduced.

It can be seen from FIG. 1 of U.S. Pat. No. 1,111,841 and the relative position between working piston and supercharger piston illustrated therein that the working piston precedes the supercharger piston.

Furthermore, a connecting line wherein a regenerator is provided is arranged between the combustion cylinder and the supercharger cylinder of the internal combustion engine known from U.S. Pat. No. 1,111,841. The charging takes place via the connecting line and through the regenerator via an opening in the supercharger cylinder controlled by a slide. The hot exhaust gases flow through the connecting line and the regenerator to the outside atmosphere via an exhaust with slide valve control.

A re-expansion (=back expansion) from the combustion cylinder into the supercharger cylinder and from there to the outside is impossible in U.S. Pat. No. 1,111,841, since in the latter the connecting line is still closed by the slide at the instant of exhaust gas discharge (cf. position according to FIG. 2).

It is not known from German Pat. No. 614,347 to use variable phase shifts in internal combustion engines. For, in German Pat. No. 614,347, merely the compression is changed; the phase angle over 2 remains constant at all times (unless the adjustment were to be constantly changed during operation of the engine). There is no automatic change feature.

SUMMARY OF THE INVENTION

The invention is based on the object of improving, with relatively low structural expense, the degree of efficiency as well as the pollutant emission while simultaneously providing maximum insensitivity of the engine with respect to the fuels utilized.

This object has been attained in an internal combustion engine of the type described hereinabove by providing that the supercharger cylinder is connected, in every position of the pistons, with the combustion cylinder by way of the connecting line wherein the regenerator is arranged; that the crankcases of supercharger cylinder and combustion cylinder can be filled with fresh air by way of intake slots controlled by the pistons, while the pistons pass through their top dead center; that both crankcases can be emptied into the supercharger cylinder above the piston within the latter; and that there are provided in the supercharger cylinder outlet slots controlled therein by the piston and/or an outlet valve for the discharging of the exhaust gases in the cylinder head of the supercharger cylinder.

In the construction of the reciprocating piston internal combustion engine according to this invention, heat recovery at a high degree of efficiency is attained by the regenerator, accompanied by considerable additional advantages. Thus, injection of the fuel can take place at low pressure, and the injected fuel passes, in the combustion cylinder, into warm exhaust gas to which is fed only later the air required for combustion by way of the supercharger cylinder, preheated by the regenerator, whereupon ignition takes place, for example, with the aid of a conventional spark plug.

The structure of the internal combustion engine according to this invention affords, on the one hand, the possibility of re-expansion, i.e. the combusted gases can still be expanded into the supercharger cylinder when the piston contained in the combustion cylinder has reached bottom dead center, since the piston contained in the supercharger cylinder is still on its way toward the bottom.

A further advantage of the engine of this invention resides in that merely combusted exhaust gases are present in the combustion cylinder during the compression stroke so that the fuel required for the subsequent working stroke can be introduced into these working gases, for example by an injection nozzle, whereupon combustion air precompressed by the supercharger cylinder and heated by the regenerator is subsequently introduced and thereafter ignition is initiated. These possibilities furthermore afford the advantages described above, which are not realized in the internal combustion engines of the state of the art.

BRIEF DESCRIPTION OF THE FIGURES

Additional details and features of the invention can be seen from the dependent claims, as well as from the following description of two embodiments with reference to the appended drawings wherein:

FIG. 1 is a schematic lateral view of a first embodiment of a regeneratively operating two-stroke reciprocating internal combustion engine, FIG. 2 shows the internal combustion engine of FIG. 1, seen from the side of the supercharger cylinder, FIG. 3 shows a lateral view of a second embodiment of an internal combustion engine, and FIG. 4 shows the internal combustion engine of FIG. 3, seen from the side of the supercharger cylinder.

DETAILED DESCRIPTION

The reciprocating internal combustion engine illustrated in FIGS. 1 and 2 comprises two cylinders 2 and 3 coupled by way of a regenerator 1, the regenerator being located in a line 4 connecting the cylinders 2 and 3. Preferably, the line 4 is an integral part of the cylinder head 5 of the two cylinders 2 and 3. The pistons 6 and 7 move with mutual phase shift, the piston 6, acting as a supercharger piston, in cylinder 2 (supercharger cylinder) trailing the combustion piston 7 in cylinder 3 (combustion cylinder) by an angle of between and 30° and 90°.

Below the pistons 6 and 7, respectively, two preferably mutually separated crankcases 8 and 9 are provided which can be filled with fresh air by way of intake slots 10 and 11, respectively, controlled by the pistons 6 and 7. In this arrangement, the intake slots 10 and 11 are uncovered by the pistons while the latter move through their top dead center.

In the embodiment shown in FIGS. 1 and 2, the pistons 6 and 7 are coupled via connecting rods 12 and 13 with a crankshaft 14 extending through both crankcases 8 and 9.

The crankcases 8 and 9 are in communication with a supercharger chamber 15, designed as a conduit; in the zone of the orifice of conduit 15 leading into the crankcases 8 and 9, one-way valves 16 and 17, respectively, are provided in each case, permitting the transfer of fresh air from the crankcases 8 and 9 into the supercharger chamber 15. In this way, fresh air can pass even during the movement of the pistons 6 and 7 from their top dead centers to their bottom dead centers via the valves 16 and 17 in succession into the supercharger chamber 15, fashioned as a conduit, and from there, via the charging slot 18, can be forced into the supercharger cylinder 2 connected to the colder end of regenerator 1. This takes place at the time the supercharger piston 6 moves about its bottom dead center, and the charging slots 18 and, respectively, the discharging slots 19 are vacated.

In this way, change of cylinder charge takes place in the supercharger cylinder 2, on the one hand, and a portion of the residual exhaust gas, still present in combustion cylinder 3, is displaced, on the other hand, during the movement of piston 7 from its bottom dead center in the direction toward top dead center via the regenerator 1 (while transferring heat to the latter) and via the supercharger cylinder 2.

It is to be pointed out at this place that it is possible to provide an outlet valve at the cylinder head of the supercharger cylinder 2, instead of the outlet slot 19 controlled by the piston 6, in the presence of which slot a transverse or reverse flushing takes place in the supercharger cylinder. Such a valve 20 is illustrated in FIG. 1 in dashed lines and permits cocurrent flushing of the supercharger cylinder 2. The valve 20, provided as an alternative to the outlet slot 19, is located preferably at the region of the cold end of the regenerator 1.

During the compression phase in cylinders 2 and 3, i.e. during the movement of the pistons 6 and 7 in the upward direction, fuel is injected via an injection nozzle 21 into the hot residual gas of the preceding combustion present in the combustion cylinder 3. During this step, depending on the excess of air in the residual gas and on the amount of injected fuel, a very much oxygen-depleted, gaseous exhaust gas-fuel mixture is produced. This exhaust gas-fuel mixture, contained in combustion cylinder 3, is replenished with fresh air from the supercharger cylinder 2 by the supercharger piston 6 which approaches its top dead center, the fresh air being heated up in regenerator 1. This fresh air can react, optionally supported by an ignition 22 (spark plug) with the exhaust gas-fuel mixture in combustion cylinder 3, and is combusted while the piston 7 in the combustion cylinder 3 moves downwardly.

During the movement of piston 7 in the combustion cylinder 3 in the zone of its bottom dead center, a reexpansion of the exhaust gases contained in the combustion cylinder 3 can take place, by way of the regenerator with simultaneous heat transfer to the latter, into the supercharger cylinder 2. This re-expansion is performed until the subsequent phase of changing the charge can begin after vacating the outlet slots 19 (or opening the outlet valve 20).

In contrast to the embodiment shown in FIGS. 1 and 2, wherein the angle of phase shift between the combustion cylinder and the trailing supercharger cylinder 6 is constant, this angle changes periodically during the stroke of pistons 6 and 7 in the embodiment of the internal combustion engine according to FIGS. 3 and 4. In this connection, the provision is made that the leading angle of the combustion piston 7 in the combustion cylinder 3 varies from a relatively small value in the zone of the top dead center of the combustion piston 7 to a relatively large phase angle in the region of the bottom dead center of the combustion piston 7. By this choice of change in the leading angle of the combustion piston 7 as compared with the supercharger piston 6, a higher compression is ensured in the region of the top dead center of combustion piston 7, and an improved re-expansion is ensured in the zone of the bottom dead center of the combustion piston 7. The manner in which this change in the leading angle of the combustion piston 7 with respect to the supercharger piston 6 is attained is not of primary importance to the invention.

In the embodiment shown in FIGS. 3 and 4, the variation of the trailing angle of the supercharger piston 6 in the supercharger cylinder 1, based on the combustion piston 7 in cylinder 3, is obtained by coupling the pistons 6 and 7, respectively, via their connecting rods 12 and 13, respectively, with separate crankshafts 23 and 24. In the illustrated embodiment, control of the trailing angle of the crankshaft 23 of piston 6 in the supercharger cylinder 2 is effected in dependence on the angle of the crankshaft 24 of piston 7 in the combustion cylinder 3 by means of a push rod 25 rotatably engaging, eccentrically to the crankpin 26 of the crankshaft 23 of piston 6, at the connecting rod 12 of the latter, this push rod being driven by the crankshaft 24 via an arm 27 provided at the latter and extending into the crankcase 8. The eccentric articulation of the push rod 25 to the crankpin 26 of crankshaft 12 is provided by means of a short auxiliary arm 28 integrated into the connecting rod 12.

Depending on the geometrical design of this coupling linkage, the trailing angle of the crankshaft 23 of piston 6 with respect to the crankshaft 24 of piston 7 can be set to the desired value and amounts, in the proximity of the top dead center of pistons 6 and 7 to about 45° and in the proximity of the bottom dead center thereof to about 90°.

I claim:

1. In a regeneratively operating two-stroke reciprocating internal combustion engine with at least one combustion cylinder (3) containing a piston (7), a supercharger cylinder (2) containing a piston (6), and a connecting line connected between the combustion and supercharger cylinders, the connecting line contained a regenerator (1) between the cylinders and an ignition device and a fuel injection arrangement associated with the combustion cylinder (3), wherein the pistons of the combustion cylinder (3) and of the supercharger cylinder (2) operate with a mutual phase shift by an angle of between 30+ and 90°, the piston of the combustion cylinder (3) leading the piston of the supercharger cylinder (2); the improvement in which the supercharger cylinder (2) is connected, in every position of the pistons (6, 7), with the combustion cylinder (3) by way of the connecting line (4) wherein the regenerator (1) is arranged; that crankcases (8, 9) of supercharger cylinder (2) and combustion cylinder (3) can be filled with fresh air by way of intake slots (10, 11) controlled by the pistons (6, 7), while the pistons (6, 7) pass through their top dead center; both crankcases (8, 9) can be emptied into the supercharger cylinder (2) above the piston (6) within the supercharger cylinder; and there are provided in the supercharger cylinder (2) one of outlet slots (19) controlled therein by the piston (6) of the supercharger cylinder (2) and an outlet valve (20) for the discharging of the exhaust gases in the cylinder head (5) of the supercharger cylinder (2).

2. Internal combustion engine according to claim 1, characterized in that a catalyst is associated with the regenerator (1), this catalyst serving for reducing pollutant content in the exhaust gases.

3. Internal combustion engine according to claims 1, characterized in that the regenerator (1) is provided in a conduit (4) connecting the cylinder head (15) of the supercharger cylinder (2) and the combustion cylinder (2).

4. Internal combustion engine according to claim 3, characterized in that the conduit (4) housing tee regenerator (1) is integrated into the cylinder head (5).

5. In a regeneratively operating two-stroke reciprocating internal combustion engine with at least one combustion cylinder (3) containing a piston (7), a supercharger cylinder (2) containing a piston (6), and a connecting line connected between the combustion and supercharger cylinders, the connecting line containing a regenerator (1) between the cylinders and an ignition device and a fuel injection arrangement associated with the combustion cylinder (3), wherein the pistons of the combustion cylinder (3) and of the supercharger (2) operate with a mutual phase shift by an angle of between 30° and 90°, the piston of the combustion cylinder (3) leading the piston of the supercharger cylinder (2); the improvement wherein
  (a) the supercharger cylinder (2) is connected with the combustion cylinder (3) by way of the connecting line (4) containing the regenerator (1) for every position of the pistons (6, 7);
  (b) the angle of phase shift between the pistons (6, 7) arranged in the supercharger cylinder (2) and the combustion cylinder (3), respectively, changes during the stroke of these pistons and is smaller in a zone of the top dead center of the piston (7) in the combustion cylinder (3) and larger in the bottom dead center of the piston (7) in the combustion cylinder;
  (c) crankcases (8, 9) of the supercharger cylinder (2) and of the combustion cylinder (3) can be filled with fresh air by way of intake slots (10, 11) controlled by the pistons (6, 7), while the pistons pass through their top dead center;
  (d) both crankcases (8, 9) can be emptied into the supercharger cylinder (2) above the piston (6) within the supercharger cylinder; and
  (e) there are provided in the supercharger cylinder (2) one of outlet slots (19) controlled therein by the piston (6) of the supercharger cylinder (2) and an outlet valve (20) for the discharging of the exhaust gases in the cylinder head (5) of the supercharger cylinder (2).

6. Internal combustion engine according to claim 5, characterized in that the angle of phase shift in the zone of top dead center of the piston (7) in the combustion cylinder (3) amounts to about 45° and in the zone of bottom dead center to about 90°.

7. Internal combustion engine according to claim 5, characterized in that a crankshaft (24) of the combustion cylinder (3) is connected to a crankshaft (23) of the supercharger cylinder (2) via a lever linkage (27, 25, 28).

8. Internal combustion engine according to claim 7, characterized in that the lever linkage connecting the crankshafts (23, 24) of the combustion cylinder (3) and the supercharger cylinder (2) includes a push rod (25) rotatably articulated, eccentrically to a, crankpin (26) of the crankshaft (23) of the supercharger piston (6), at a connecting rod (12) of the supercharger piston, wherein a point of articulation of the push rod (25) has a spacing with respect to the crankpin (26) of the crankshaft (23) of the supercharger cylinder (2).

9. Internal combustion engine according to claim 5, characterized in that the crankcases (8, 9) of the supercharger cylinder (2) and the combustion cylinder (3) are crank chambers (8, 9) pneumatically separated from each other.

10. Internal combustion engine according to claim 5, characterized in that a nose (29) is provided on the piston (6) of the supercharger cylinder (2), preferably between an orifice of the air inlet slots and the outlet slots.

11. In a regeneratively operating two-stroke reciprocating internal combustion engine with at least one combustion cylinder (3) containing a piston (7), a supercharger cylinder (2) containing a piston (6), and a connecting line connected between the combustion and supercharger cylinders, the connecting line containing a regenerator (1) between the cylinders and an ignition device and a fuel injection arrangement associated with the combustion cylinder (3), wherein the pistons of the combustion cylinder (3) and of the supercharger (2) operate with a mutual phase shift by an angle of between 30° and 90°, the piston of the combustion cylinder (3) leading the piston of the supercharger cylinder (2); the improvement wherein
(a) the supercharger cylinder (2) is connected with the combustion cylinder (3) by way of the connecting line (4) containing the regenerator (1) for every position of the pistons (6, 7);
(b) crankcases (8, 9) of the supercharger cylinder (2) and of the combustion cylinder (3) can be filled with fresh air by way of intake slots (10, 11) controlled by the pistons (6, 7), while the pistons pass through their top dead center;
(c) both crankcases (8, 9) can be emptied into the supercharger cylinder (2) above the piston (6) within the supercharger cylinder;
(d) there are provided in the supercharger cylinder (2) one of outlet slots (19) controlled therein by the piston (6) of the supercharger cylinder (2) and an outlet valve (20) for the discharging of the exhaust gases in the cylinder head (5) of the supercharger cylinder (2); and
(e) a conduit (15) is provided between the crankcases (8, 9) and the supercharger cylinder (2) and one-way valves (16, 17) are provided between the crankcases and the conduit to admit air into the conduit from the crankcases.

12. In a regeneratively operating two-stroke reciprocating internal combustion engine with at least one combustion cylinder (3) containing a piston (7), a supercharger cylinder (2) containing a piston (6), and a connecting line connected between the combustion and supercharger cylinders, the connecting line containing a regenerator (1) between the cylinders and an ignition device and a fuel injection arrangement associated with the combustion cylinder (3), wherein the pistons of the combustion cylinder (3) and of the supercharger (2) operate with a mutual phase shift by an angle of between 30° and 90°, the piston of the combustion cylinder (3) leading the piston of the supercharger cylinder (2); the improvement wherein
(a) the supercharger cylinder (2) is connected with the combustion cylinder (3) by way of the connecting line (4) containing the regenerator (1) for every position of the pistons (6, 7);
(b) crankcases (8, 9) of the supercharger cylinder (2) and of the combustion cylinder (3) can be filled with fresh air by way of intake slots (10, 11) controlled by the pistons (6, 7), while the pistons pass through their top dead center;
(c) both crankcases (8, 9) can be emptied into the supercharger cylinder (2) above the piston (6) within the supercharger cylinder; and
(d) there are provided in the supercharger cylinder (2) one of outlet slots (19) controlled therein by the piston (6) of the supercharger cylinder (2) and an outlet valve (20) for the discharging of the exhaust gases in the cylinder head (5) of the supercharger cylinder (2), the outlet valve (20) being provided in the connecting line (4) in a zone of a cold end of the regenerator (1).

* * * * *